United States Patent
Wilkinson et al.

(10) Patent No.: US 10,535,053 B2
(45) Date of Patent: Jan. 14, 2020

(54) SCANNER-BASED APPARATUS AND METHOD

(71) Applicant: Walmart Apollo, LLC, Bentonville, AR (US)

(72) Inventors: Bruce W. Wilkinson, Rogers, AR (US); Starla C. Morgan, Bentonville, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 126 days.

(21) Appl. No.: 15/644,229

(22) Filed: Jul. 7, 2017

(65) Prior Publication Data

US 2018/0012214 A1    Jan. 11, 2018

Related U.S. Application Data

(60) Provisional application No. 62/360,352, filed on Jul. 9, 2016.

(51) Int. Cl.
*G06Q 20/00* (2012.01)
*G06Q 40/00* (2012.01)
(Continued)

(52) U.S. Cl.
CPC ....... *G06Q 20/208* (2013.01); *G06K 7/10297* (2013.01); *G06Q 20/20* (2013.01); *G06Q 20/407* (2013.01)

(58) Field of Classification Search
CPC .................................................... G06Q 20/208
See application file for complete search history.

(56) References Cited

U.S. PATENT DOCUMENTS 5,963,134 A  10/1999 Bowers
8,473,363 B1  6/2013 Oakes
(Continued)

FOREIGN PATENT DOCUMENTS

WO   2010099525   9/2010

OTHER PUBLICATIONS

PCT; App. No. PCT/US2017/041137; International Search Report and Written Opinion dated Sep. 14, 2017.
(Continued)

*Primary Examiner* — Ariel J Yu
(74) *Attorney, Agent, or Firm* — Fitch, Even, Tabin & Flannery LLP

(57) ABSTRACT

A retail shopping facility having at least one public entrance, a customer service area, a product display area, and at least one point-of-sale (POS) station also has at least one scanner configured to remotely and uniquely identify a product previously purchased from the product display area as that product re-enters the retail shopping facility via the public entrance with a customer. That scanner provides corresponding identifying information regarding that returning product to a control circuit that in turn uses that information to automatically process an exchange transaction of the returning product for a substitute product in the product display area such that the exchange transaction occurs without the customer engaging either the customer service area or one of the POS stations.

18 Claims, 3 Drawing Sheets

(51) Int. Cl.
*G06Q 20/20* (2012.01)
*G06K 7/10* (2006.01)
*G06Q 20/40* (2012.01)

(56) References Cited

U.S. PATENT DOCUMENTS

| | | | |
|---|---|---|---|
| 9,692,738 B1* | 6/2017 | Wenneman | H04L 63/08 |
| 10,268,984 B1* | 4/2019 | Ramoji | G06Q 10/087 |
| 2001/0037207 A1* | 11/2001 | Dejaeger | G06Q 20/10 |
| | | | 705/39 |
| 2002/0019783 A1* | 2/2002 | Chol | G06Q 10/08 |
| | | | 705/27.1 |
| 2002/0019785 A1* | 2/2002 | Whitman | G06Q 10/087 |
| | | | 705/28 |
| 2003/0217007 A1* | 11/2003 | Fukushima | G06Q 30/06 |
| | | | 705/51 |
| 2006/0085297 A1 | 4/2006 | Minerley | |
| 2006/0241967 A1* | 10/2006 | Gross | G06Q 30/06 |
| | | | 705/307 |
| 2008/0249870 A1 | 10/2008 | Angell | |
| 2009/0083052 A1* | 3/2009 | Bokor | G06Q 30/06 |
| | | | 705/1.1 |
| 2009/0125442 A1* | 5/2009 | Otto | G06Q 20/04 |
| | | | 705/39 |
| 2009/0281935 A1 | 11/2009 | Junger | |
| 2012/0123865 A1 | 5/2012 | Salzano | |
| 2012/0127307 A1* | 5/2012 | Hassenzahl | G07F 7/069 |
| | | | 348/143 |
| 2012/0310657 A1* | 12/2012 | Jankowski | H04N 7/18 |
| | | | 705/1.1 |
| 2013/0085696 A1* | 4/2013 | Xu | B60L 3/12 |
| | | | 702/63 |
| 2014/0214481 A1* | 7/2014 | Argue | G06Q 30/0261 |
| | | | 705/7.29 |
| 2014/0316919 A1 | 10/2014 | Li | |
| 2014/0368156 A1* | 12/2014 | Aloe | H02J 7/0003 |
| | | | 320/106 |
| 2015/0012396 A1* | 1/2015 | Puerini | G06Q 10/0875 |
| | | | 705/28 |
| 2015/0039458 A1 | 2/2015 | Reid | |
| 2015/0170111 A1* | 6/2015 | Evenson | G06Q 10/30 |
| | | | 705/308 |
| 2015/0262115 A1* | 9/2015 | Meulenberg | G06Q 10/087 |
| | | | 705/7.15 |
| 2016/0300296 A1* | 10/2016 | Alonso Cembrano | G06Q 30/08 |
| 2017/0221030 A1* | 8/2017 | Clark | G06K 7/10722 |
| 2017/0243265 A1* | 8/2017 | Li | G06Q 30/0601 |
| 2017/0260010 A1* | 9/2017 | Bacallao | G06K 19/07758 |
| 2018/0018650 A1* | 1/2018 | Gottstein | G01P 3/00 |
| 2018/0047006 A1* | 2/2018 | Johnson | G06Q 20/208 |
| 2018/0308047 A1* | 10/2018 | Wardell | G06Q 10/0837 |

OTHER PUBLICATIONS

Wal-Mart Stores, Inc.; How do I return an item that was a gift?; http://help.walmart.com/app/answers/detail/a_id/204/~/how-do-i-return-an-item-that-was-a-gift?; Available at least as early as Feb. 17, 2016; pp. 1-2.

* cited by examiner

SCANNER-BASED APPARATUS AND METHOD

RELATED APPLICATION(S)

This application claims the benefit of U.S. Provisional Application No. 62/360,352, filed Jul. 9, 2016, which is incorporated herein by reference in its entirety.

TECHNICAL FIELD

These teachings relate generally to scanners such as RFID-tag readers.

BACKGROUND

In a modern retail store environment, there is a need to improve the customer experience and/or convenience for the customer. With increasing competition from non-traditional shopping mechanisms, such as online shopping provided by e-commerce merchants and alternative store formats, it can be important for "bricks and mortar" retailers to focus on improving the overall customer experience and/or convenience.

One source of frustration for customers is realizing, post purchase, that a particular purchased product is somehow not the correct product. For example, the customer may have purchased a wrong size or a wrong brand of the product. As another example the customer may have purchased a wrong version of a given product (for example, a soft drink that contains caffeine rather than an uncaffeinated version of the drink).

Such an error may be realized while transporting one's purchases to one's vehicle in the parking lot for the retail shopping facility, while placing the purchases in that vehicle, or upon unpacking one's purchases at home. In all of these cases the customer must return to the retail shopping facility to return the incorrect product and to obtain the correct product. Returning the incorrect product and effecting an exchange typically involves engaging associates of the retail shopping facility at a customer service area thereof and/or at a point of sale station. Such procedures, and waiting in line to receive the benefits of such services, can often consume considerably more time than the customer wishes to devote to such an endeavor and can lead to corresponding frustration and disappointment.

BRIEF DESCRIPTION OF THE DRAWINGS

The above needs are at least partially met through provision of the scanner-based apparatus and method described in the following detailed description, particularly when studied in conjunction with the drawings, wherein.

Figure 1:
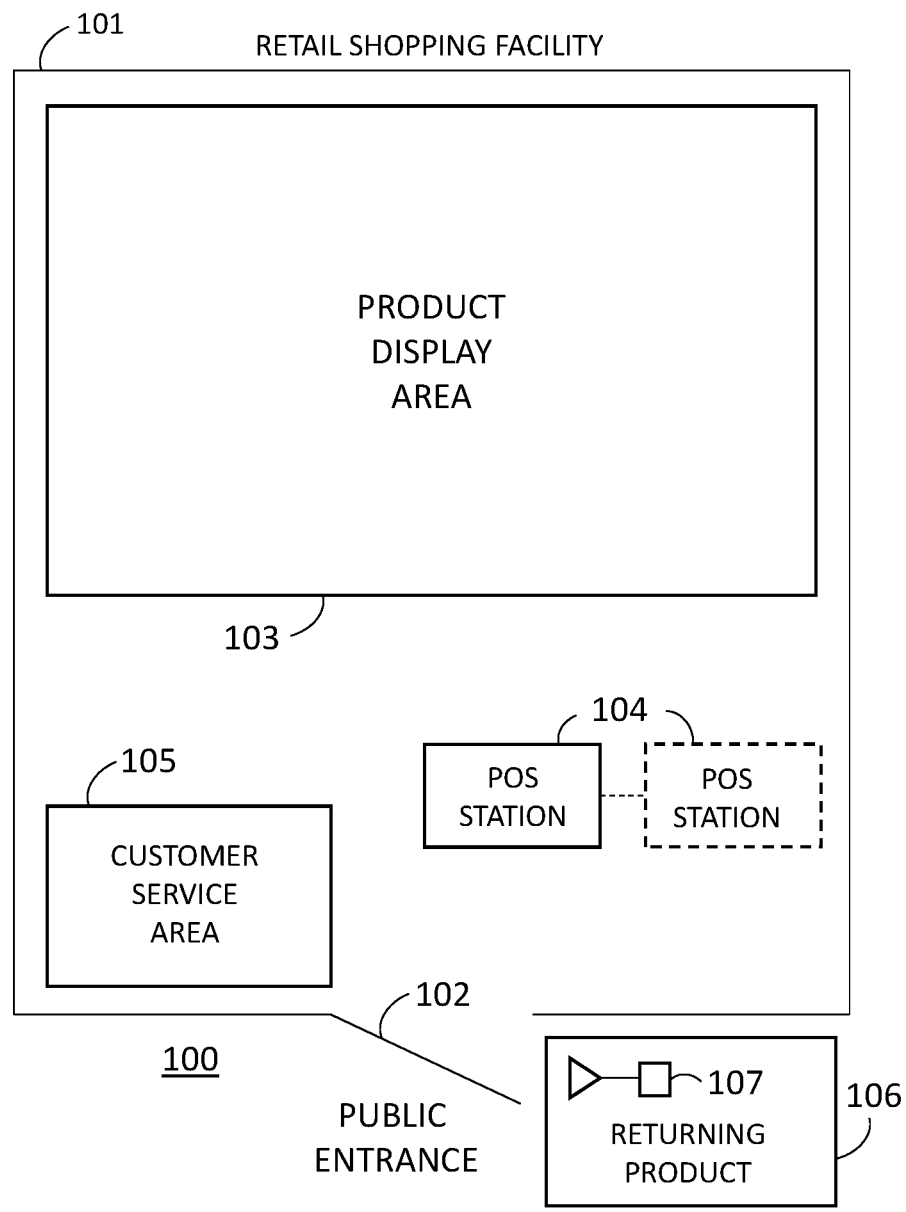
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments a retail shopping facility having at least one public entrance, a customer service area, a product display area, and at least one point-of-sale (POS) station also has at least one scanner configured to remotely and uniquely identify a product previously purchased from the product display area as that product re-enters the retail shopping facility via the public entrance with a customer. That scanner provides corresponding identifying information regarding that returning product to a control circuit that uses that information to automatically process an exchange transaction of the returning product for a substitute product in the product display area such that the exchange transaction occurs without the customer engaging either the customer service area or one of the POS stations.

By one approach the aforementioned scanner comprises a radio-frequency identification (RFID) scanner that reads an RFID tag that corresponds to the returning product to obtain the aforementioned identifying information. If desired these teachings will also accommodate using the scanner to identify the customer as well. For example, the customer may carry (in their wallet or purse, for example) a card that includes an RFID tag containing identifying information for the bearer.

By one approach the control circuit determines the period of elapsed time between when the customer purchased the returning item and when the product re-enters the retail shopping facility. In that case, if desired, the control circuit can optionally condition effecting the aforementioned automated exchange upon whether the customer re-entered the retail shopping facility within a predetermined period of time following when the returning product was purchased.

By one approach, in lieu of the foregoing or in combination therewith, these teachings will accommodate permitting the customer to enter the product display area to personally exchange the returning product for the substitute product. This activity may include permitting the customer to simply place the returning product back in an appropriate display location and taking the substitute product from its respective display location. The customer can leave the retail shopping facility without engaging either the customer service area or a POS station. Instead, the control circuit makes use of updated information provided by the scanner to automatically effect an economic refund to the customer for the returned product and a purchase of the substitute product by the customer.

By yet another approach, and again in lieu of the foregoing or in combination therewith, these teachings will accommodate using the aforementioned identifying information to automatically process a supplemental purchase transaction of a supplemental product from the product display area such that the supplemental purchase transaction occurs without the customer engaging either the customer service area or a POS station.

So configured, a customer can readily, efficiently, and nearly transparently correct a purchasing error even though the customer has exited from the retail shopping facility after having made their purchase. At the same time, the enterprise operating the retail shopping facility has considerable assurance that the described activities are not fraudulent in nature and do not unduly increase the risk of loss due to theft.

These and other benefits may become clearer upon making a thorough review and study of the following detailed description. Referring now to the drawings, FIG. 1 presents an apparatus 100 that includes a retail shopping facility 101. The retail shopping facility 101 comprises a retail sales facility or any other type of bricks-and-mortar (i.e., physical) facility in which products are physically displayed and offered for sale to customers who physically visit the facility. The shopping facility includes at least one public entrance 102, one or more product display areas 103 where items available for purchase are displayed, point of sale (POS) locations 104 where a customer presents their selected items and where their purchase of those items is consummated (either via an associate or an unmanned check-out station), and a customer service area 105 other than a checkout location (such as a service area to handle returned products). A typical retail shopping facility may include other areas as well including but not limited to exterior or interior parking locations, stock room areas, stock receiving areas, hallway areas, common areas shared by merchants, and so on. The facility may be any size or format of facility, and may include products from one or more merchants. For example, a facility may be a single store operated by one merchant or may be a collection of stores covering multiple merchants such as a mall.

Figure 2:
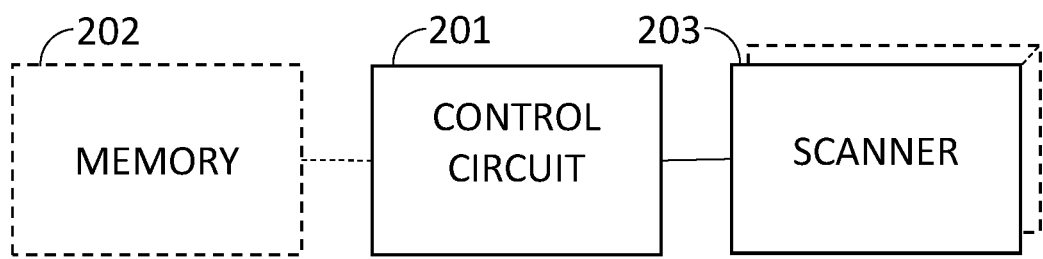
FIG. 2 comprises a block diagram as configured in accordance with various embodiments of these teachings.

Referring momentarily to FIG. 2, the apparatus 100 further includes a control circuit 201. This control circuit 201 may or may not be physically located, in whole or in part, at the retail shopping facility 100 itself as desired. Being a "circuit," the control circuit 201 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 201 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 201 is configured (for example, by using corresponding programming as will be well understood by those skilled in the art) to carry out one or more of the steps, actions, and/or functions described herein.

By one optional approach the control circuit 201 operably couples to a memory 202. This memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

In addition to storing information regarding products and customers (and their respective RFID tag information) this memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The control circuit 201 also operably couples to at least one scanner 203. This scanner 203 is typically going to be installed within reading distance of the public entrance 102 of the retail shopping facility 101 and is configured to remotely and uniquely identify a product (as illustrated in FIG. 1 by reference numeral 106) previously purchased from the product display area 103 that re-enters the retail shopping facility 101 via the public entrance 102 with a customer (not shown). Depending upon the needs of a given application setting these teachings will also accommodate installing one of more such scanners 203 elsewhere within the retail shopping facility 101 as well (for example, within or around the product display area 103).

By one illustrative example the scanner 203 comprises an RFID scanner. RFID scanners (also sometimes referred to as readers) are well known in the art and require no further elaboration here. In this case the scanner 203 can be configured to read an RFID tag 107 that is uniquely physically and logically correlated to the returning product 106. The Electronic Product Code (EPC) as managed by EPCGlobal, Inc., for example, represents one useful approach in these regards. EPC-based RFID tags each have an utterly unique serial number (within the EPC system) to thereby uniquely identify each tag and, by association, each product associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 (often referred to as "EPC GEN2") is hereby fully incorporated herein by this reference). So configured, the aforementioned memory 202 can store information that correlates each such unique serial number with information regarding the product (including, for example, information such as the stock keeping unit (SKU) number for the product and so forth).

Those skilled in the art will understand that the control circuit 201 can operably couple to any number of other components and elements as desired. For example, the control circuit 201 could couple to a network interface such as either or both of a wireless and non-wireless platform. Such possibilities are not shown here for the sake of clarity and brevity.

Figure 3:
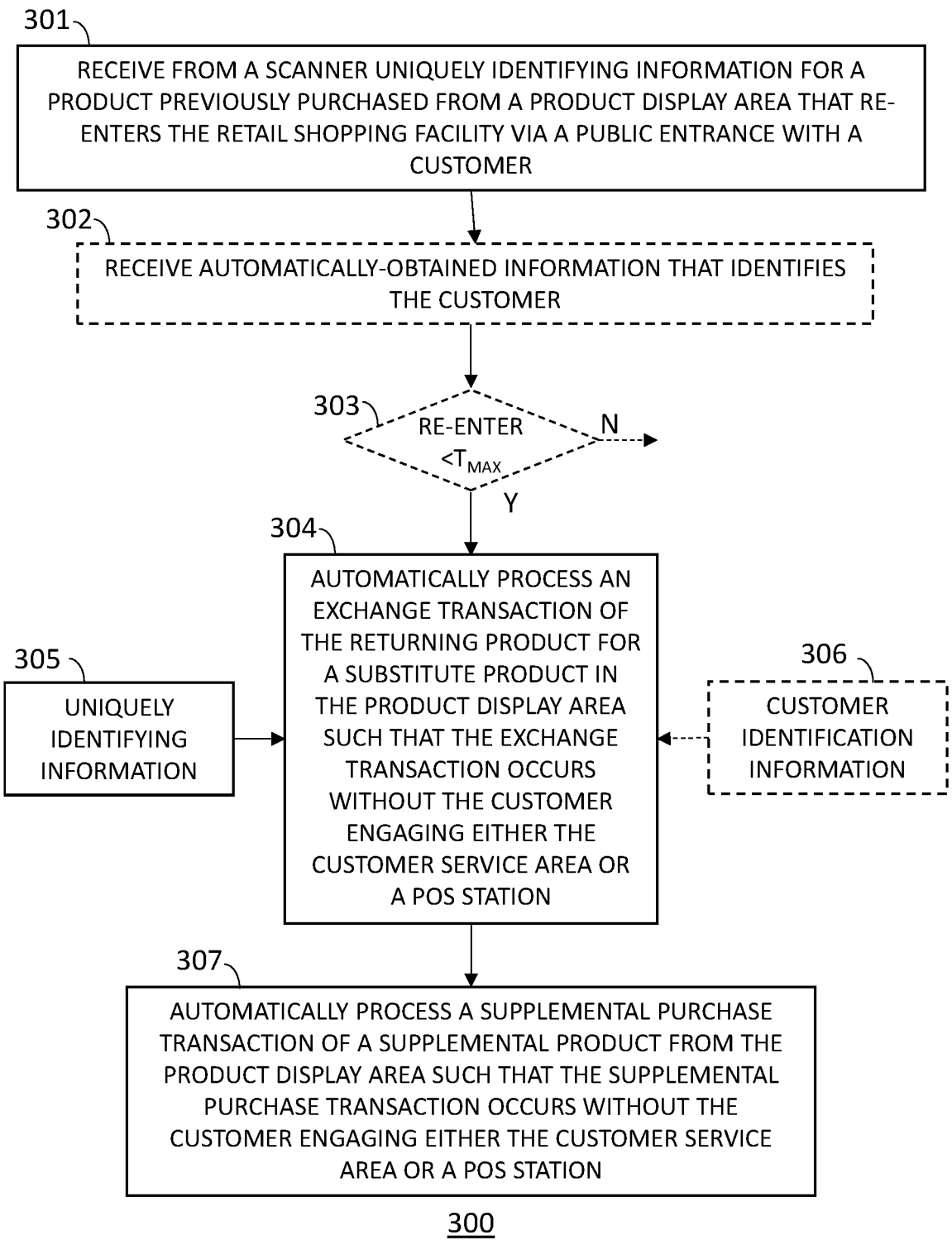
FIG. 3 comprises a flow diagram as configured in accordance with various embodiments of these teachings.

FIG. 3 presents a process 300 that can be employed by such an apparatus 100. It will be understood that the specifics of this example are intended to serve in an illustrative capacity and are not intended to suggest any particular limitations in these regards.

At block 301 this process provides for the control circuit 201 to receive from the aforementioned scanner 203 (or scanners, as the case may be) uniquely identifying information (for example, a unique serial number for an RFID tag 107) for a product 106 that was previously purchased from the product display area 103 of a retail shopping facility 101, which product 106 is re-entering the retail shopping facility 101 via the public entrance 102 for the retail shopping facility 101 with a customer.

By one optional approach, and as illustrated by optional block 302, the control circuit 201 also receives automatically-obtained information that identifies that customer. As one illustrative example in these regards the customer carries a card (such as a so-called loyalty card) that itself includes an RFID tag harboring a unique serial number that is correlated in the records of the retail shopping facility enterprise with this specific customer. That correlated information might include, for example, the customer's name, contact information (home address, telephone number, email address, and so forth), a preferred payment method (such as a credit or debit card number, Paypal account, checking account, and so forth), and the like.

By one approach the control circuit 201 can also receive other information in addition to the aforementioned information that identifies the customer. As one example in these regards the control circuit 201 can receive information regarding recent geographic locations for that customer. That information could be provided, for example, via a query to the location capability of the customer's smartphone. Via another approach, a wireless geo-fence system at the perimeter of the parking lot of the retail shopping facility 101 can be configured to interact with the user's device and can itself provide information to the control circuit 201 regarding whether, for example, the user left that parking lot before returning to the retail shopping facility 101. As yet another example in these regards a license-plate reader(s) system can be configured to read vehicular license plates as the corresponding vehicles enter and leave the parking lot and that information, correlated with information regarding the customer, can also be used to detect, for example, whether the customer left the parking lot before re-entering the retail shopping facility 101.

At optional decision block 303 the control circuit 201 determines whether the customer is re-entering the retail shopping facility 101 within a predetermined amount of time $T_{MAX}$ following when the returning product 106 was purchased. The predetermined amount of time can be any duration of choice such as ten minutes, half an hour, one hour, six hours, and so forth. These teachings will also accommodate using a dynamic value such that, for example, the predetermined amount of time may vary depending upon the time of day, the day of the week, the season, or even on a customer-by-customer basis (such that, for example, certain preferred customers possibly have the benefit of a longer window of time). When making this determination the control circuit 201 may access, for example, records of the recent purchase that may be stored in the aforementioned memory 202 to thereby determine the time at which that purchase occurred. So configured, the control circuit 201 can automatically conclude this process 300 if the customer is returning to the retail shopping facility 101 at a point in time that is beyond that predetermined amount of time.

When the control circuit 201 receives location information as described above, in lieu of the foregoing or in combination therewith the control circuit 201 can use that information to determine whether the customer has journeyed beyond some predetermined point or boundary before returning to the retail shopping facility 101. These teachings will accommodate, for example, automatically not continuing with this process 300 if the customer traveled too far from the retail shopping facility 101 before returning. Or, as a related example, these teachings will accommodate not continuing with this process 300 if the customer traveled too far and/or too late before returning to the retail shopping facility 101.

At block 304 the control circuit 201 automatically processes an exchange transaction of the returning product for a substitute product in the product display area 103. This activity can be based, at least in part, on the aforementioned uniquely identifying information 305 for the returned product 106 and also, when available, the aforementioned customer-identification information 306 as well. For example, one or more properly located scanners 203 may detect that the customer is leaving the product display area 103 without the returning product 106 but with another product instead (where the scanner(s) 106 are reading an RFID tag for the substitute product that identifies the substitute product). In response to that set of circumstances the control circuit 201 can automatically refund the purchase price of the returned product 106 (for example, by crediting the customer's credit card) and charge the price of the substitute product to the customer (for example, by charging the customer's credit card).

So configured the customer is able to effect an exchange that includes a refund and a new charge without engaging either the customer service area 105 or a POS station 104 at any time upon re-entering the retail shopping facility 101.

These teachings are highly flexible in practice and will accommodate various modifications and elaborations. As one simple example in these regards, and as illustrated at optional block 307, this process 300 will also accommodate having the control circuit 201 automatically process a supplemental purchase transaction of a supplemental product from the product display area 103 where the supplemental purchase transaction occurs without the customer engaging either the customer service area 105 or a POS station 104. For example, in addition to exchanging one size container of shampoo for a particular brand for another size of that same brand of shampoo, the customer may also pick up a toothbrush and a can of spray deodorant as supplemental selections. Pursuant to these teachings the returning customer can effect both the exchange and the supplemental purchases without being required, for example, to stand in line at a check-out counter or to interact with an associate at the customer service area 105.

While these teachings are not likely to assuage the customer of all feelings of disappointment when the customer realizes they made an incorrect purchase, these teachings can go far to help minimize that feeling of disappointment and can certainly minimize the time and effort required to correct the situation.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
   a retail shopping facility having at least one public entrance, a customer service area, a product display area, and at least one point-of-sale (POS) station;
   a scanner configured to remotely and uniquely identify a product previously purchased from the product display area that re-enters the retail shopping facility via the public entrance with a customer and to provide corresponding identifying information;

a control circuit operably coupled to the scanner and configured to use the identifying information to automatically process an exchange transaction of the returning product for a substitute product in the product display area such that the exchange transaction occurs without the customer engaging either the customer service area or a POS station, and wherein the control circuit is further configured to condition automatically processing the exchange transaction, at least in part, upon at least one of:

whether the customer re-entered the retail shopping facility within a predetermined period of time following when the returning product was purchased; and whether the customer traveled beyond a predetermined point before re-entering the retail shopping facility.

2. The apparatus of claim 1 wherein the scanner comprises a radio-frequency identification (RFID) scanner.

3. The apparatus of claim 2 wherein the scanner remotely and uniquely identifies the returning product by reading an RFID tag that corresponds to the returning product.

4. The apparatus of claim 1 wherein the scanner is further configured to identify the customer and provide corresponding customer-identification information, and wherein the control circuit is further configured to use the customer-identification information to automatically process the exchange transaction.

5. The apparatus of claim 1 wherein the predetermined period of time is no more than one hour.

6. The apparatus of claim 1 wherein the exchange transaction includes permitting the customer to enter the product display area to personally exchange the returning product for the substitute product.

7. The apparatus of claim 1 wherein the control circuit is further configured to:

use the identifying information to automatically process a supplemental purchase transaction of a supplemental product from the product display area such that the supplemental purchase transaction occurs without the customer engaging either the customer service area or a POS station.

8. The apparatus of claim 7 wherein the control circuit is further configured to:

condition automatically processing the supplemental purchase transaction, at least in part, upon whether the customer re-entered the retail shopping facility within a predetermined period of time following when the returning product was purchased.

9. The apparatus of claim 8 wherein the predetermined period of time is no more than one hour.

10. A method for use at a retail shopping facility having at least one public entrance, a customer service area, a product display area, and at least one point-of-sale (POS) station:

receiving from a scanner uniquely identifying information for a product previously purchased from the product display area that re-enters the retail shopping facility via the public entrance with a customer;

using the uniquely identifying information to automatically process an exchange transaction of the returning product for a substitute product in the product display area such that the exchange transaction occurs without the customer engaging either the customer service area or a POS station, wherein the automatic processing of the exchange transaction is automatically conditioned, at least in part, upon whether the customer re-entered the retail shopping facility within a predetermined period of time following when the returning product was purchased.

11. The method of claim 10 wherein the scanner comprises a radio-frequency identification (RFID) scanner.

12. The method of claim 11 wherein the scanner remotely and uniquely identifies the returning product by reading an RFID tag that corresponds to the returning product.

13. The method of claim 10 further comprising:

receiving automatically-obtained information that identifies the customer; and also using the customer-identification information to automatically process the exchange transaction.

14. The method of claim 10 wherein the predetermined period of time is no more than one hour.

15. The method of claim 10 wherein the exchange transaction includes permitting the customer to enter the product display area to personally exchange the returning product for the substitute product.

16. The method of claim 10 further comprising:

using the identifying information to automatically process a supplemental purchase transaction of a supplemental product from the product display area such that the supplemental purchase transaction occurs without the customer engaging either the customer service area or a POS station.

17. The method of claim 16 further comprising:

automatically conditioning the processing of the supplemental purchase transaction, at least in part, upon whether the customer re-entered the retail shopping facility within a predetermined period of time following when the returning product was purchased.

18. The method of claim 17 wherein the predetermined period of time is no more than one hour.

* * * * *